(12) United States Patent
Bae et al.

(10) Patent No.: US 12,176,579 B2
(45) Date of Patent: Dec. 24, 2024

(54) ELECTRODE ASSEMBLY AND INSPECTION METHOD THEREFOR

(71) Applicant: LG CHEM, LTD., Seoul (KR)

(72) Inventors: Kwan Hong Bae, Daejeon (KR); Chan Woo Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 817 days.

(21) Appl. No.: 17/283,246

(22) PCT Filed: May 4, 2020

(86) PCT No.: PCT/KR2020/005826
§ 371 (c)(1),
(2) Date: Apr. 6, 2021

(87) PCT Pub. No.: WO2020/231054
PCT Pub. Date: Nov. 19, 2020

(65) Prior Publication Data
US 2021/0344085 A1    Nov. 4, 2021

(30) Foreign Application Priority Data

May 14, 2019    (KR) .......................... 10-2019-0056305

(51) Int. Cl.
*H01M 50/533* (2021.01)
*G01N 21/88* (2006.01)
(Continued)

(52) U.S. Cl.
CPC ...... *H01M 50/533* (2021.01); *G01N 21/8803* (2013.01); *G01N 21/95* (2013.01); *H01M 10/0585* (2013.01); *H01M 50/46* (2021.01)

(58) Field of Classification Search
CPC ............ H01M 50/533; H01M 50/536; H01M 50/548; H01M 50/531; H01M 50/54; H01M 10/0585
See application file for complete search history.

(56) References Cited

U.S. PATENT DOCUMENTS 5,246,797 A *   9/1993   Imhof ................. H01M 50/534
                                                              429/234
5,667,915 A *   9/1997   Loustau ................. B23K 20/16
                                                              429/211
(Continued)

FOREIGN PATENT DOCUMENTS

CN       101490873 A       7/2009
CN       206293534 U       6/2017
(Continued)

OTHER PUBLICATIONS

Extended European Search Report dated Feb. 4, 2022 issued by the European Patent Office in a corresponding European Patent Application No. 20806202.6.

*Primary Examiner* — Helen Oi K Conley
*Assistant Examiner* — Amanda Rosenbaum
(74) *Attorney, Agent, or Firm* — MORGAN, LEWIS & BOCKIUS LLP

(57) ABSTRACT

The present invention relates to an electrode assembly and an inspection method therefor, whereby tab folding and alignment of an electrode may be accurately checked. The electrode assembly, according to one embodiment, has a structure in which at least one unit cell is laminated, the unit cell having a structure of a first electrode/a separator/a second electrode/a separator/a third electrode, wherein the first electrode and the third electrode may each comprise a tab protruding toward the outer periphery of one side, and (Continued)

the second electrode may comprise a tab protruding toward the outer periphery of the other side facing the one side.

15 Claims, 14 Drawing Sheets

(51) Int. Cl.
  *G01N 21/95* (2006.01)
  *H01M 10/0585* (2010.01)
  *H01M 50/46* (2021.01)

(56) References Cited

U.S. PATENT DOCUMENTS

| | | | |
|---|---|---|---|
| 2002/0195990 A1* | 12/2002 | Yang | H01M 8/0247 320/107 |
| 2003/0013012 A1* | 1/2003 | Ahn | H01M 10/0585 429/152 |
| 2009/0263709 A1* | 10/2009 | Nakamura | H01M 4/70 429/162 |
| 2011/0014521 A1* | 1/2011 | Matsuyama | H01M 10/0525 429/217 |
| 2013/0196210 A1* | 8/2013 | Kim | H01M 10/0436 429/153 |
| 2015/0162590 A1 | 6/2015 | Takahashi et al. | |

FOREIGN PATENT DOCUMENTS

| | | |
|---|---|---|
| JP | 06-11258 U | 2/1994 |
| JP | 2000-195539 A | 7/2000 |
| JP | 2004-079240 A | 3/2004 |
| JP | 2005-149882 A | 6/2005 |
| JP | 2006-032224 A | 2/2006 |
| JP | 2006-128038 A | 5/2006 |
| JP | 2006-164752 A | 6/2006 |
| JP | 2009-283342 A | 12/2009 |
| JP | 2011-108534 A | 6/2011 |
| JP | 2014-049193 A | 3/2014 |
| JP | 2017-084654 A | 5/2017 |
| KR | 10-1997-0054628 A | 7/1997 |
| KR | 10-2013-0116835 A | 10/2013 |
| KR | 10-2015-0061997 A | 6/2015 |
| KR | 10-2015-0072234 A | 6/2015 |
| KR | 2016-0079227 A | 7/2016 |
| KR | 10-1805529 B1 | 11/2017 |
| KR | 10-2018-0097243 A | 8/2018 |
| KR | 10-2018-0106367 A | 10/2018 |
| KR | 10-2019-0086942 A | 7/2019 |
| WO | 2015/186169 A1 | 12/2015 |

* cited by examiner

[FIG. 1]
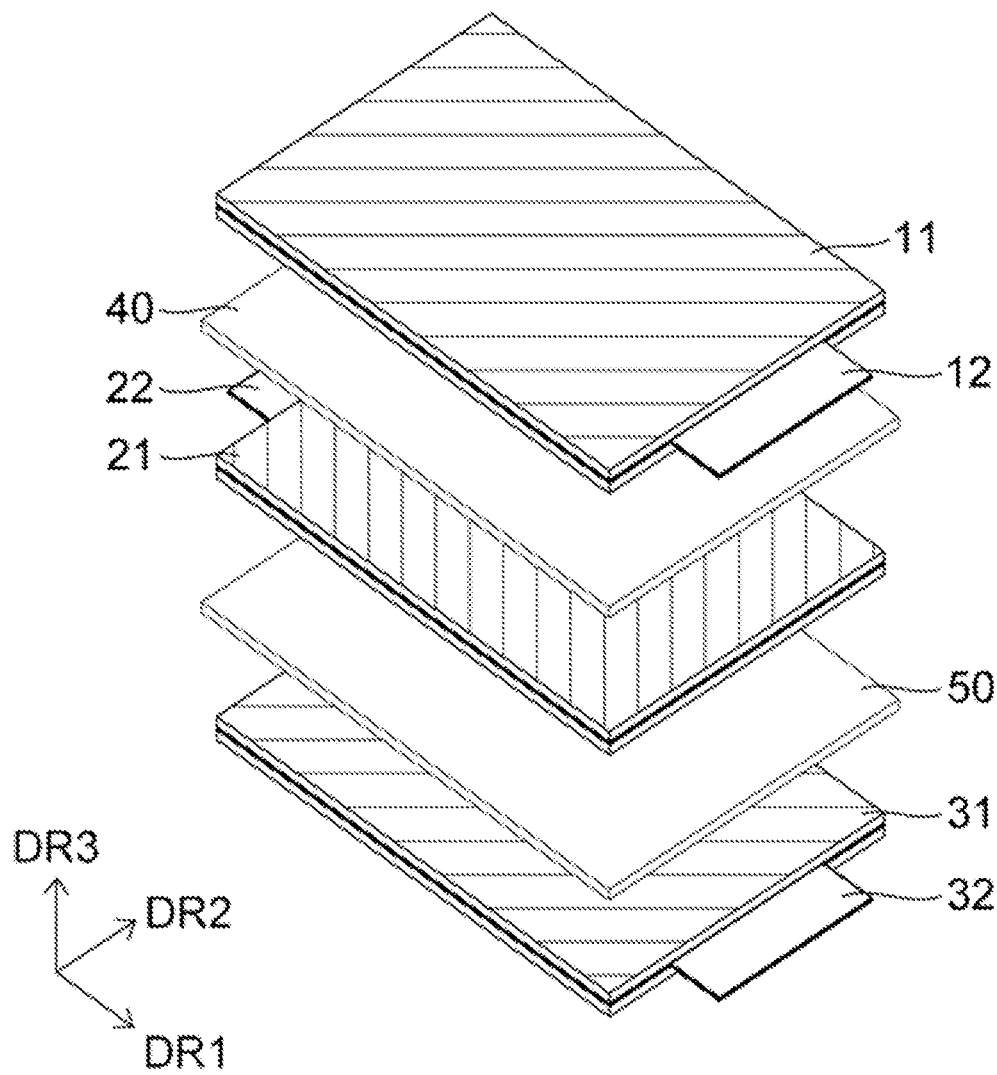

[FIG. 2]
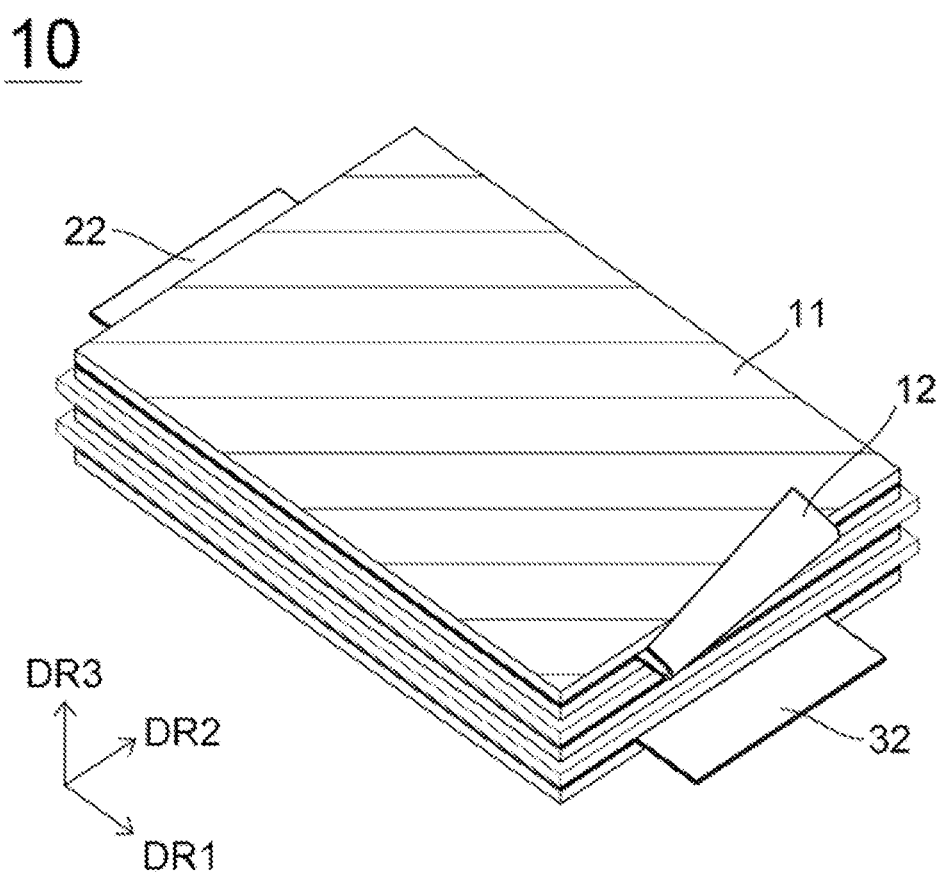

[FIG. 3]
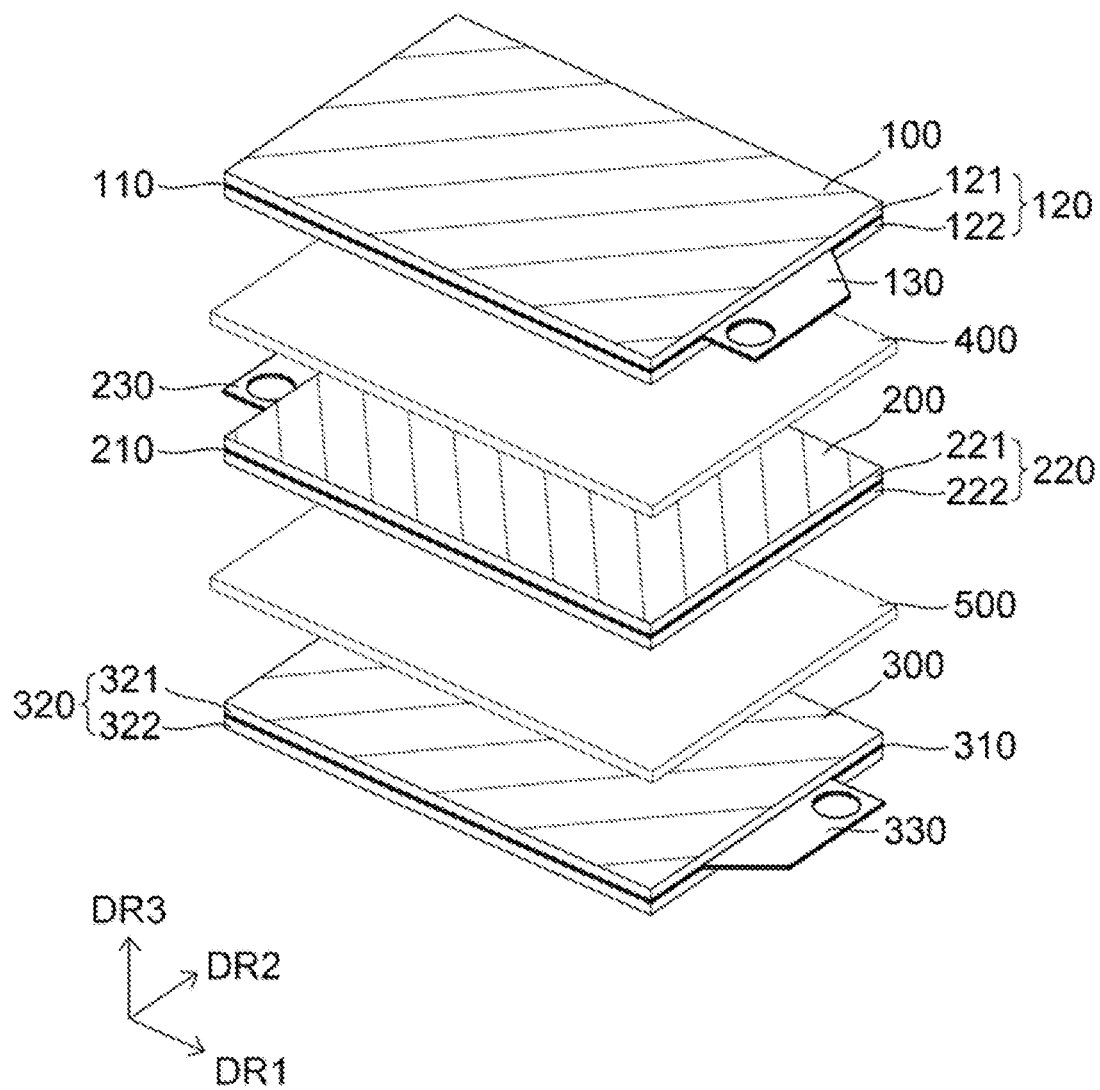

[FIG. 4]
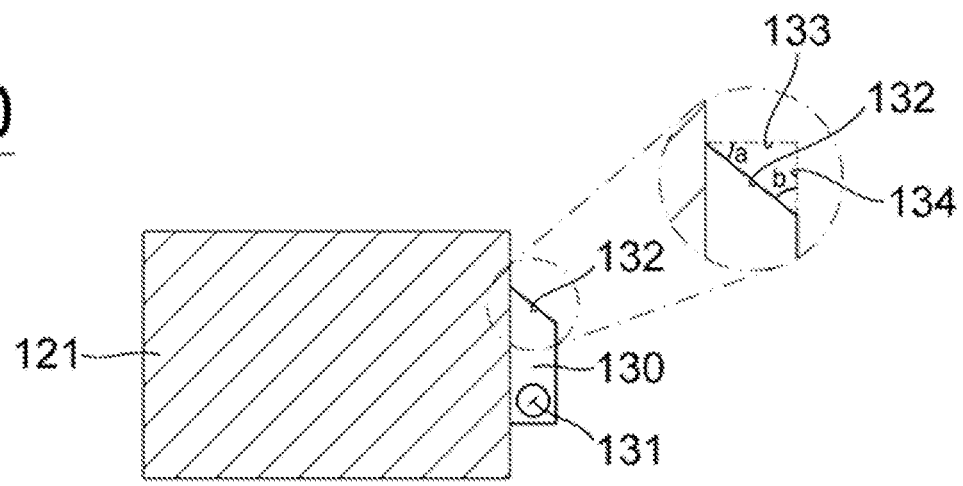
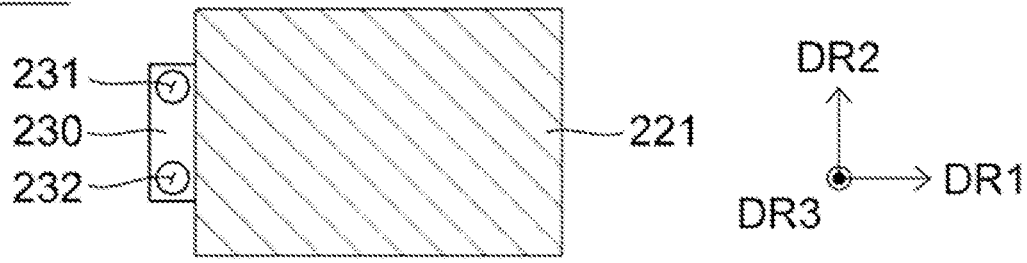
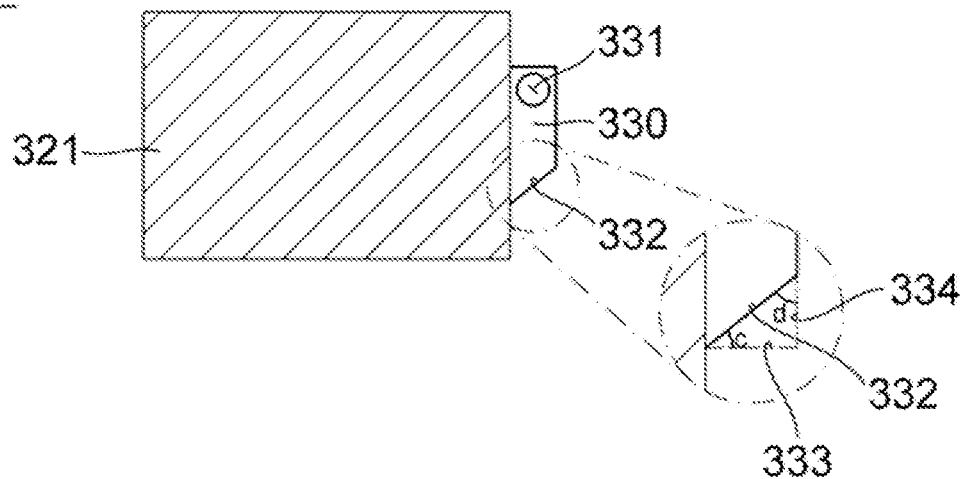

[FIG. 5]
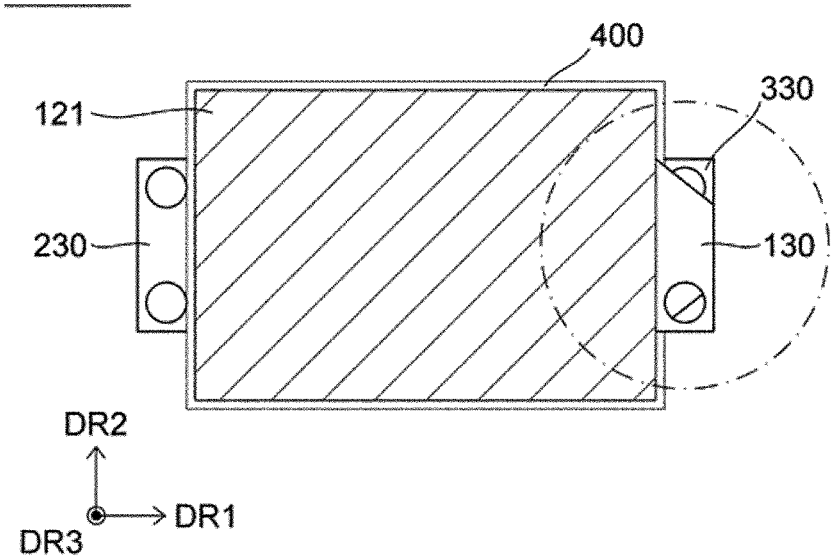

[FIG. 6]
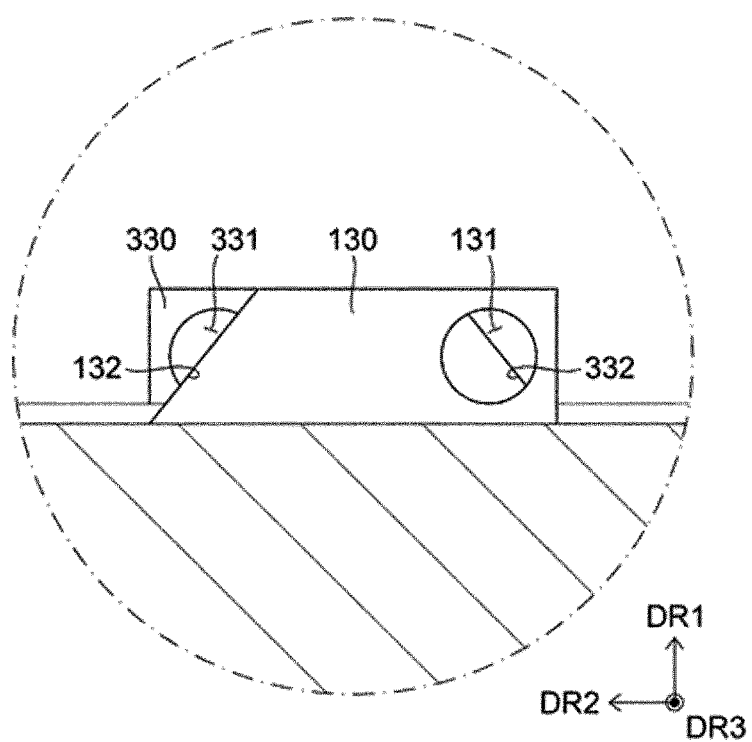

[FIG. 7]
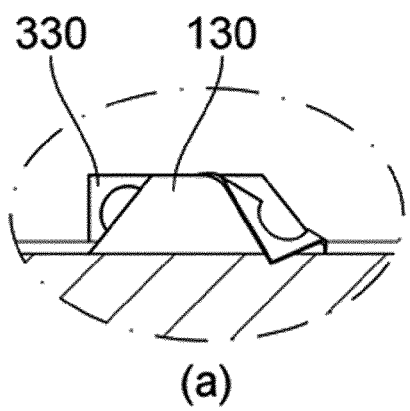
(a)
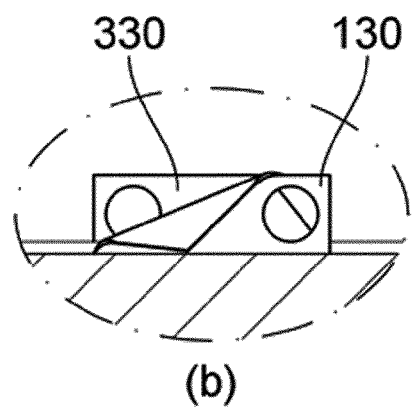
(b)
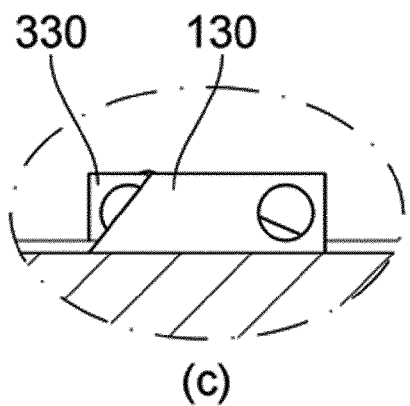
(c)
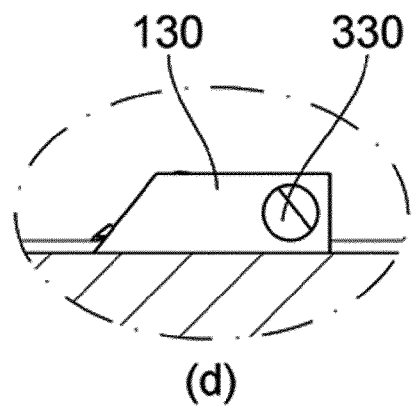
(d)
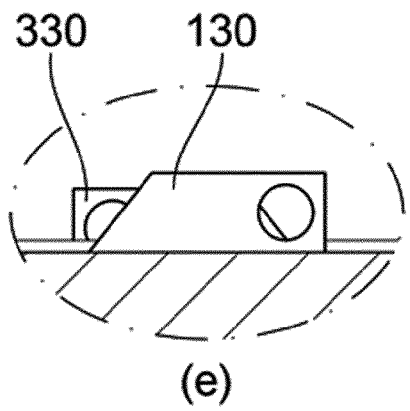
(e)
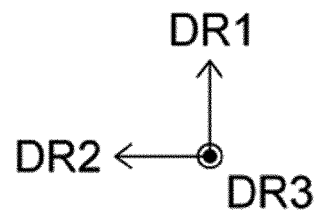

[FIG. 8]
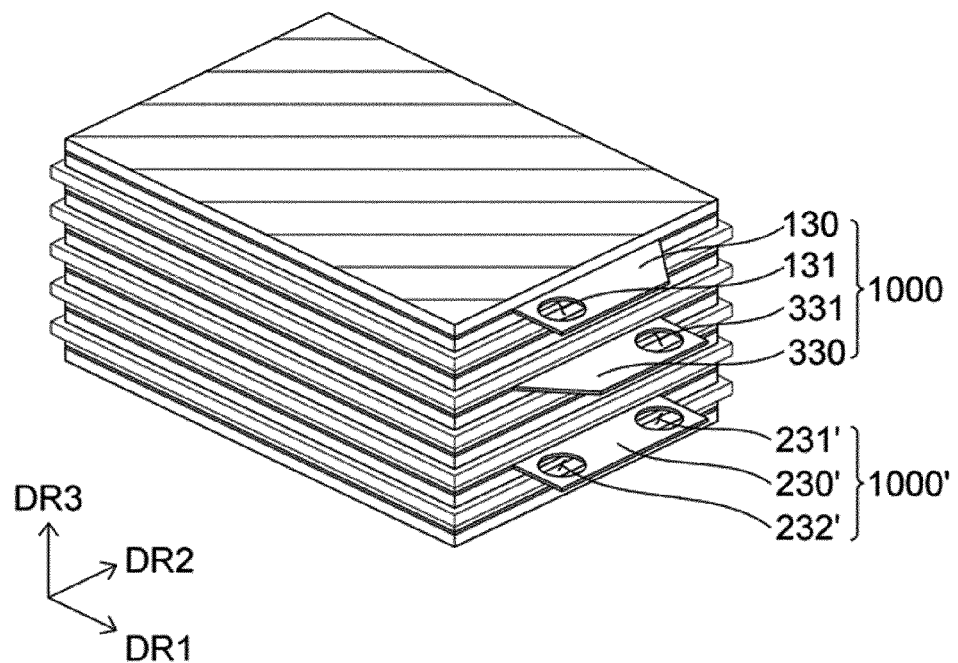

[FIG. 9]
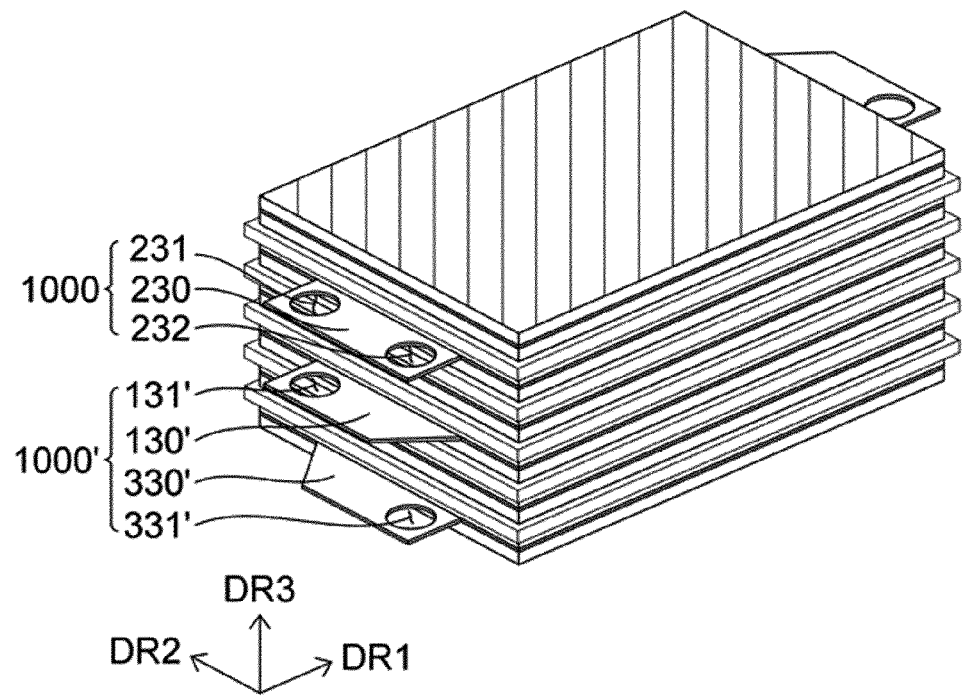

[FIG. 10]
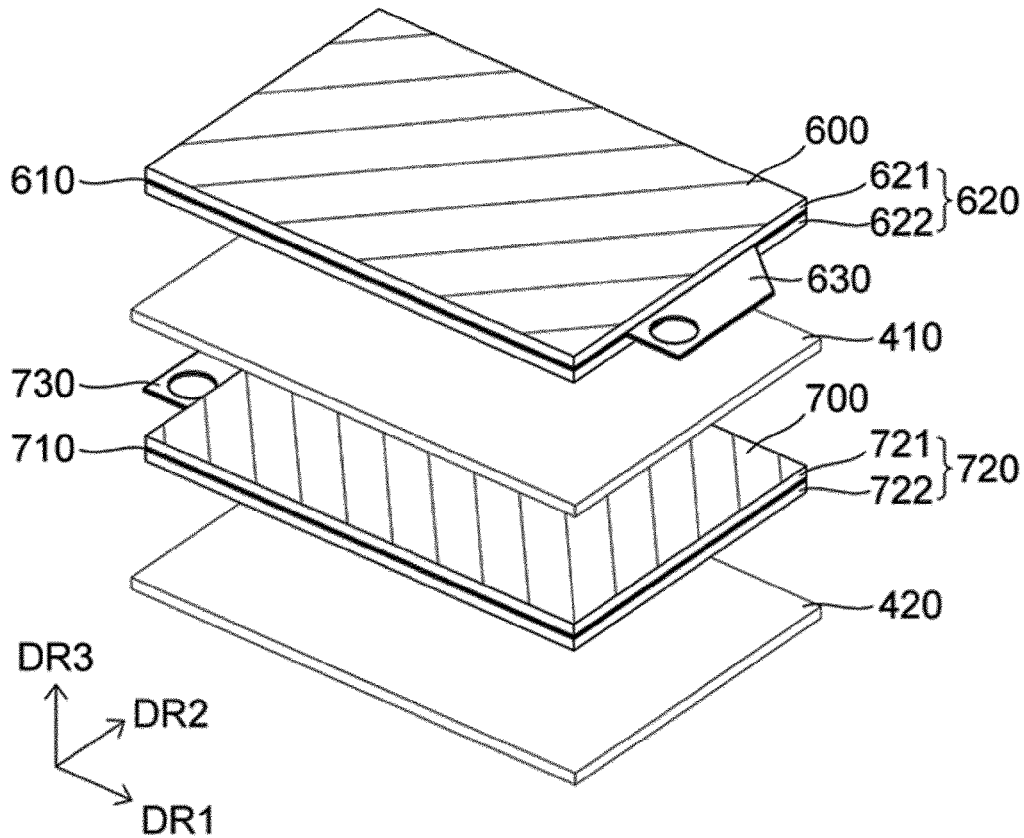

[FIG. 11]
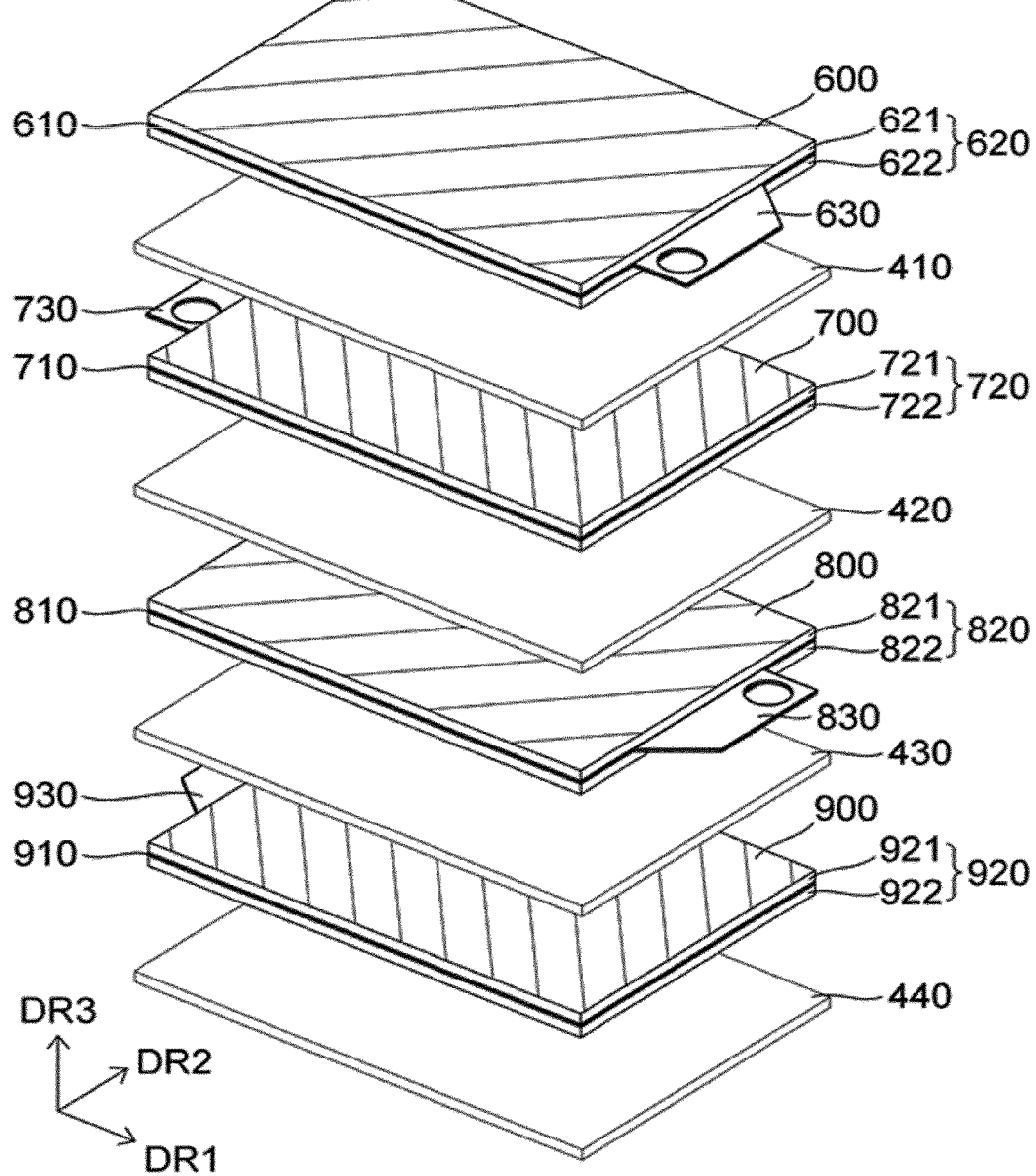

[FIG. 12]
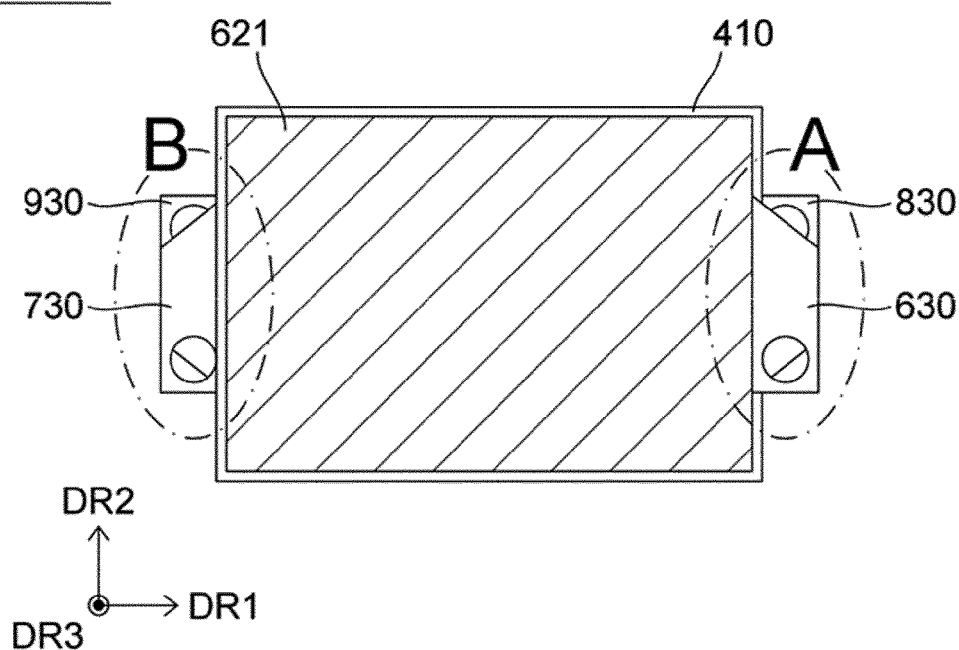

[FIG. 13]
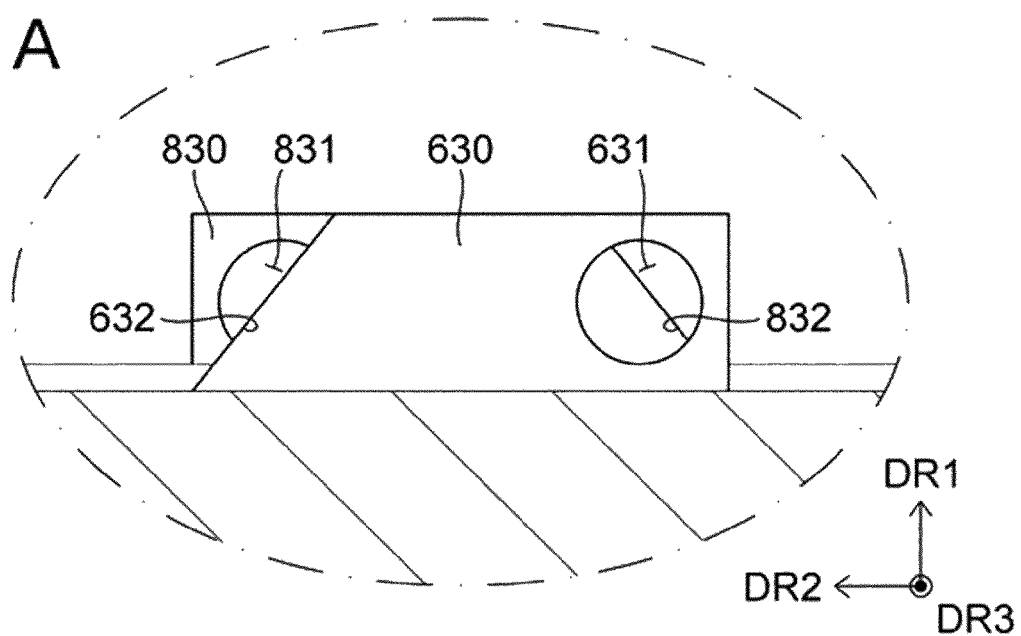

[FIG. 14]
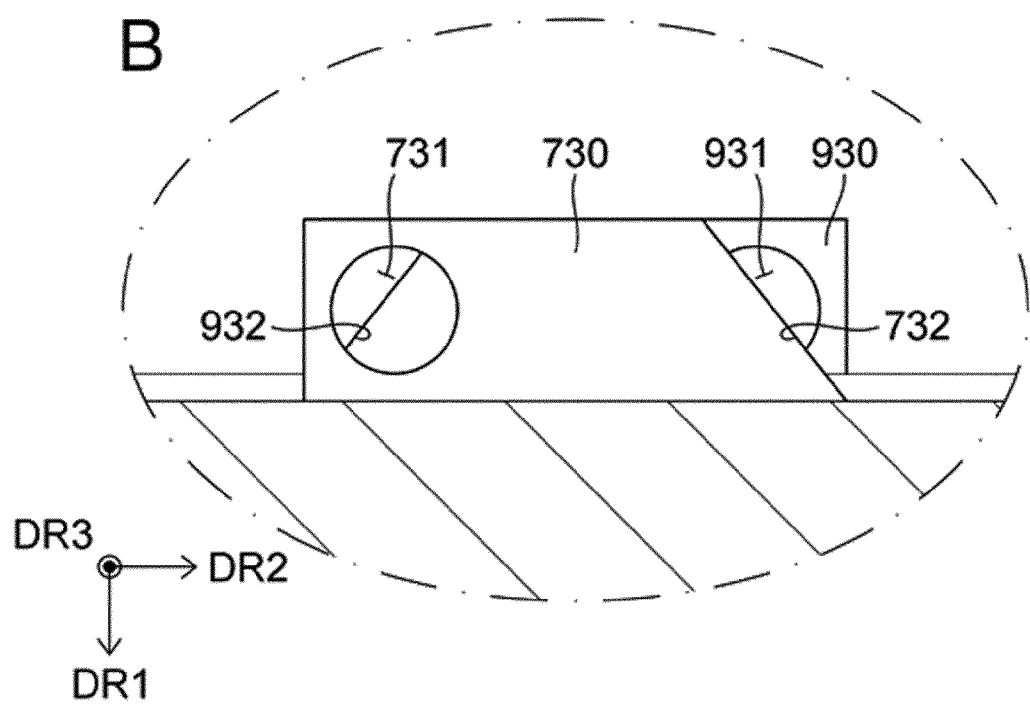

ELECTRODE ASSEMBLY AND INSPECTION METHOD THEREFOR

TECHNICAL FIELD

This application claims the benefit of priority based on Korean Patent Application No. 10-2019-0056305, filed on May 14, 2019, and the entire contents of the Korean patent application are incorporated herein by reference.

The present invention relates to an electrode assembly capable of easily and accurately checking the tab folding and alignment of an electrode with the naked eye, and an inspection method thereof.

BACKGROUND ART

Secondary batteries that can be charged and discharged are attracting attention as a power source for devices requiring high power and large capacity, such as electric vehicles (EVs), hybrid electric vehicles (HEVs), and plug-in hybrid electric vehicles (Plug-In HEVs) that have been proposed as solutions to air pollution in diesel vehicles.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

Such secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

The secondary battery has a structure in which an electrode assembly made of a positive electrode, a negative electrode, and a separator interposed therebetween and an electrolyte are stored in a battery case. As the secondary battery is a device based on electrochemical reaction, it is inevitably sensitive to environmental factors. Further, since the secondary battery is manufactured through a series of processes in which small parts are precisely mounted and connected in a limited space, product quality may also deteriorate due to errors in some devices and incomplete work of some workers. In addition, in the manufacturing process of the secondary battery by the mass production system, serious defects may be caused by small defects in the process.

Accordingly, after every manufacturing process step and/or manufacturing finished products, inspection of the secondary battery should be closely conducted. This inspection is one of the most important parts in the production process of a secondary battery and is important in terms of quality control to check whether it provides desired performance and stability. Here, quality control is to check whether the secondary battery properly has a charge/discharge performance, produce good products, and select defective products. By performing such quality control well, it is possible to produce high quality secondary batteries.

FIG. 1 is an exploded perspective view schematically showing a general structure of a conventional bi-cell, and FIG. 2 is a perspective view schematically showing a structure in which the bi-cells of FIG. 1 are stacked.

Referring to FIG. 1, the bi-cell has a structure in which positive electrodes 11 and 31 where both sides of the positive electrode current collector are coated with active materials, and a negative electrode 21 where both sides of the negative electrode current collector are coated with negative electrode active materials are sequentially stacked while separators 40 and 50 are interposed therebetween. Further, multiple positive electrode tabs 12 and 32 and negative electrode tab 22, where the positive electrode lead and negative electrode lead constituting the electrode terminal of the battery are not coated with active materials for electrical connection, respectively, protrude at the end of one side of each of the positive electrode current collector and the negative electrode current collector.

The plurality of positive electrode tabs 12 and 32 and negative electrode tab 22 are made of foil materials and may be tab-folded 12 as shown in FIG. 2 during the process, and when the tab folding occurs, the capacity of the secondary battery may be reduced or an internal short circuit may be caused.

In addition, in the structure in which the electrode units 10 are stacked, the internal tab folding is not automatically inspected in appearance, and the internal short circuit caused by the tab folding is a fatal quality item that can cause stability issues and relies on manual inspection.

Particularly, as in an electrode assembly in which bi-cells of a positive electrode(negative electrode)/separator/negative electrode(positive electrode)/separator/positive electrode(negative electrode) structure are sequentially stacked and an electrode assembly in which full-cells of a positive electrode(negative electrode)/separator/negative electrode (positive electrode)/separator structure are sequentially stacked, in the electrode unit formed of a structure in which positive and negative electrodes are stacked in multiple layers, defects of the positions of internal electrodes cannot be checked, and it is difficult to find out defects such as electrode tab folding.

DISCLOSURE

Technical Problem

In order to solve the problems of the prior art as described above, an object of the present invention is to provide an electrode assembly capable of easily and accurately checking the tab folding and alignment of an electrode without disassembling the stacked electrode assembly, and an inspection method thereof.

Technical Solution

An electrode assembly according to a first embodiment of the present invention has a structure in which at least one unit cell of a first electrode/a separator/a second electrode/separator/a third electrode structure is stacked, in which each of the first electrode and the third electrode includes a tab protruding toward an outer periphery of one side, and the second electrode includes a tab protruding toward an outer periphery of the other side facing the one side, each of the first electrode tab and the third electrode tab includes a through hole formed in an edge of one side, and an inclined portion forming a predetermined angle with respect to an virtual extension line extending from both outer peripheries adjacent to each other among outer peripheries of the tab in an edge of the other side, and the through hole of the first electrode tab and the inclined portion of the third electrode tab are arranged to overlap with each other.

At this time, the tab of the second electrode may be provided with a through hole in the edge of the one side and the edge of the other side facing the one side, respectively.

Further, the first electrode and the third electrode may have the same polarity, and the first electrode and the second electrode may have opposite polarities.

Further, an electrode assembly according to a second embodiment of the present invention has a structure in which at least one unit cell of a first electrode/a separator/a second electrode/separator structure is stacked, in which the first electrode includes a tab protruding toward an outer periphery of one side, and the second electrode includes a tab protruding toward an outer periphery of the other side facing the one side, and each of the first electrode tab and the second electrode tab includes a through hole formed in an edge of one side, and an inclined portion forming a predetermined angle with respect to an virtual extension line extending from both outer peripheries adjacent to each other among outer peripheries of the tab in an edge of the other side.

Further, in the electrode assembly, two or more of the unit cells may be stacked, the through hole of the first electrode tab in one unit cell and the inclined portion of the first electrode tab in an immediately adjacent unit cell may be arranged to overlap with each other, and the through hole of the second electrode tab in one unit cell and the inclined portion of the second electrode tab in an immediately adjacent unit cell may be arranged to overlap with each other.

Each of the inclined portions may be formed in a straight line forming the predetermined angle, and the predetermined angle is 10 to 80 degrees.

Each of the through holes may have a shape selected from the group consisting of a circle, a rectangle, and a square, respectively, and the shapes of the through holes may be the same.

In addition, a method for inspecting an electrode assembly according to the first embodiment of the present invention includes: a step of preparing the electrode assembly of claim 1; a step of vision-inspecting a shape of an inner surface of a through hole of a first electrode tab formed as the through hole of the first electrode tab overlaps with the inclined portion of the third electrode tab of the electrode assembly, and a shape of an inner surface of a through hole of the third electrode tab formed as the inclined portion of the first electrode tab overlaps with the through hole of the third electrode tab; and a step of determining whether the first electrode tab or the third electrode tab is folded from a result of the vision inspection.

In the step of determining whether the first electrode tab or the third electrode tab is folded, whether the first electrode tab or the third electrode tab is folded may be determined by determining whether the shape of the inner surface of the through hole of the first electrode tab and the shape of the inner surface of the through hole of the third electrode tab are symmetrical with respect to a longitudinal direction of the tab.

Further, if two or more unit cells are stacked in the electrode assembly, the method may further include: a step of measuring an area of inner surfaces of through holes after the vision-inspecting step; and a step of determining whether a position of the electrode tab is defective from the measured area.

In the step of determining whether the position is defective, the electrodes may be arranged to allow the areas of the inner surfaces of the through holes to coincide with each other.

Meanwhile, a method for inspecting an electrode assembly according to the second embodiment of the present invention may include: a step of vision-inspecting shapes of inner surfaces of through holes of a plurality of electrode tabs having the same polarity; and a step of determining whether the electrode tabs are folded from a result of the vision inspection.

In the step of determining whether the electrode tabs are folded, whether the electrode tabs are folded may be determined by determining whether the shapes of the inner surfaces of the two through holes are symmetrical to each other in a longitudinal direction of the tabs.

Further, after the vision-inspecting step, the method may further include: a step of measuring areas of the inner surfaces of the through holes; and a step of determining whether a stacking is defective from the measured area.

Advantageous Effects

According an embodiment of the present invention, the electrode assembly according to the present invention has the advantage that it is possible to easily and accurately check the alignment of the electrode as well as the folding of the tab without disassembling the stacked electrodes and separators. Accordingly, during the manufacturing process of the secondary battery, the tab folding and alignment of the electrode assembly can be automatically inspected and checked.

As such, according to the electrode assembly and inspection method according to the present invention, despite the structure of multiple layers of positive and negative electrodes, it is possible to inspect the internal electrode position and automatically inspect defects such as internal electrode tab folding, thereby improving the ability to discriminate defective products.

BRIEF DESCRIPTION OF THE DRAWINGS

FIG. 1 is an exploded perspective view schematically showing a general structure of a conventional bi-cell.

FIG. 2 is a perspective view schematically showing a structure in which the bi-cells of FIG. 1 are stacked.

FIG. 3 is an exploded perspective view schematically showing an electrode assembly according to an embodiment of the present invention.

FIG. 4 is a plan view showing a first electrode, a second electrode, and a third electrode of FIG. 3.

FIG. 5 is a plan view showing a structure in which the electrode assembly of FIG. 3 is stacked.

FIG. 6 is an enlarged plan view of a part of FIG. 5.

FIG. 7 is a plan view schematically showing various shapes in which through holes and inclined portions of the electrode tabs are overlapped.

FIGS. 8 and 9 are perspective views illustrating an electrode assembly in which two unit cells are stacked.

FIG. 10 is an exploded perspective view schematically showing an electrode assembly according to another embodiment of the present invention.

FIG. 11 is a perspective view showing an electrode assembly in which two unit cells are stacked according to another embodiment of the present invention.

FIG. 12 is a plan view showing a structure in which the electrode assembly of FIG. 11 is stacked.

FIG. 13 is an enlarged plan view of part A of FIG. 12.

FIG. 14 is an enlarged plan view of part B of FIG. 12.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In describing the drawings, similar reference numerals are used for similar elements. In the accompanying drawings, the dimensions of the structures are shown in an enlarged scale for clarity of the invention. Terms such as "first" and "second" may be used to describe various components, but the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, an electrode assembly according to an embodiment of the present invention will be described in detail with reference to the drawings.

FIG. 3 is an exploded perspective view schematically showing an electrode assembly according to an embodiment of the present invention, and FIG. 4 is a plan view showing a first electrode, a second electrode, and a third electrode of FIG. 3.

As illustrated in FIGS. 3 and 4, the surfaces on which the electrodes and the separators are stacked are parallel to the surfaces defined by a first direction DR1 and a second direction DR2. The normal direction of the surface on which the electrode and the separator are stacked is indicated by a third direction DR3. The third direction DR3 indicates the thickness direction of an electrode assembly 1000. The front and rear surfaces of each electrode and separator are separated by the third direction DR3. However, the directions indicated by the directions DR1, DR3, and DR3 are relative concepts and can be converted to other directions.

As shown in FIG. 3, the electrode assembly 1000 of the present invention may have a structure that at least one unit cell of a bi-cell structure, in which a first electrode 100, a separator 400, a second electrode 200, a separator 500, and a third electrode 300 are sequentially stacked, is stacked.

In the present invention, the bi-cell is a concept including both A-type and C-type bi-cells. The A-type bi-cell means a bi-cell having a positive electrode/separator/negative electrode/separator/positive electrode structure, and the C-type bi-cell means a bi-cell having a negative electrode/separator/positive electrode/separator/negative electrode structure. In addition, the positive electrode and the negative electrode should be understood as a concept including a double-sided positive electrode coated with a positive electrode active material on both sides of the current collector, and a double-sided negative electrode coated with a negative electrode active material on both sides of the current collector.

Referring to FIGS. 3 and 4, the first electrode 100 is coated with active materials 121 and 122 on both sides of the first electrode current collector 110 to form a first active material layer 120, and includes a first electrode tab 130 protruding toward an outer periphery of one side of the first direction DR1.

The first electrode tab 130 may be provided with a through hole 131 formed at one edge of the second direction DR2, and an inclined portion 132 at the other edge of the second direction DR2. Here, as shown in FIG. 4, the inclined portion 132 may have a structure forming a predetermined angle (a, b) with respect to virtual extension lines 133 and 134 extending from both outer peripheries adjacent to each other among the outer peripheries of the first electrode tab 130. In addition, the inclined portion 132 is made of a straight line forming a predetermined angle (a, b), and the predetermined angle may be 10 to 80 degrees.

The second electrode 200 may have a second active material layer, which is generated active materials 221 and 222 are applied to both surfaces of the second electrode current collector 210, and have a second electrode tab 230 protruding toward the other outer periphery of the first direction DR1. In this case, the second electrode tab 230 may be provided with a pair of through holes 231 and 232 formed at both edges of the second direction DR2.

The third electrode 300 may have a third active material layer, which is generated active materials 321 and 322 are applied to both surfaces of the third electrode current collector 310, and have a third electrode tab 230 protruding toward one outer periphery of the first direction DR1.

The third electrode tab 330 may have a through hole 331 formed at one edge in the second direction DR2 and an inclined portion 332 at the other edge in the second direction DR2 as in the first electrode tab. Here, as shown in FIG. 4, the inclined portion 332 may have a structure forming a predetermined angle (c, d) with respect to virtual extension lines 333 and 334 extending from both outer peripheries adjacent to each other among the outer peripheries of the third electrode tab 330. In addition, the inclined portion 332 is made of a straight line forming a predetermined angle (c, d), and the predetermined angle may be 10 to 80 degrees.

Meanwhile, the first electrode 100 and the third electrode 300 have the same polarity, and the first electrode 100 and the second electrode 200 have opposite polarities.

In addition, the through holes 131, 231, 232, and 331 formed in the first electrode tab 130 to the third electrode tab 330 may each have a shape selected from the group consisting of a circle, a rectangle, and a square, and the shape of the through holes 131, 231, 232, and 331 may be the same.

In addition, as shown in FIGS. 3 and 4, the first electrode tab 130 and the third electrode tab 330 are formed in a structure protruding in the same direction based on the first direction DR1, and the second electrode tab 230 may have a structure that protrudes in a direction that is opposite to the first electrode tab 130 and the third electrode tab 330 based on the first direction DR1.

FIG. 5 is a plan view showing a structure in which the electrode assembly of FIG. 3 is stacked, and FIG. 6 is an enlarged plan view of a part of FIG. 5.

As illustrated in FIGS. 5 and 6, the through hole 131 of the first electrode tab 130 may be disposed to overlap the inclined portion 332 of the third electrode tab 330, and the inclined portion 132 of the first electrode tab 130 may be disposed to overlap the through hole 331 of the third electrode tab 330.

As described above, as the through hole 131 of the first electrode tab 130 overlaps with the inclined portion 332 of the third electrode tab 330, the shape of the inner surface of the through hole 131 of the first electrode tab 130 is formed in a semicircle shape. In addition, as the inclined portion 132 of the first electrode tab 130 overlaps with the through hole 331 of the third electrode tab 330, the shape of the inner surface of the through hole 331 of the third electrode tab 330 is formed in a semicircle shape.

At this time, the shape of the inner surface of the through hole 131 of the first electrode tab 130 and the shape of the inner surface of the through hole 331 of the third electrode tab 330 are symmetrical with respect to the first direction DR1. In this case, it can be confirmed that there is no folding of the first electrode tab 130 or the third electrode tab 330.

Accordingly, it is possible to check whether the electrode tabs 130 and 330 are folded through the overlapping shape of the through holes 131 and 331 and the inclined portions 132 and 332.

On the other hand, referring to FIGS. 7A and 7B, it can be seen that the inner surface shapes of the through hole of the first electrode tab 130 and the through hole of the third electrode tab 330 are asymmetrical based on the first direction DR1, through which the occurrence of folding of the first electrode tab 130 can be confirmed.

Further, referring to FIGS. 7C and 7D, it can be seen that the inner surface shapes of the through hole of the first electrode tab 130 and the through hole of the third electrode tab 330 are asymmetrical based on the first direction DR1, through which the occurrence of folding of the third electrode tab 330 can be confirmed.

In addition, referring to FIG. 7E, the outer periphery parallel to the second direction DR2 of the first electrode tab 130 and the outer periphery parallel to the second direction DR2 of the third electrode tab 330 are displaced from each other in the first direction DR1.

Hereinafter, an inspection method of the electrode assembly 1000 according to an embodiment of the present invention will be described in detail with reference to the drawings.

The inspection method of the electrode assembly 1000 may include: preparing the above-described electrode assembly 1000 (S100); vision-inspecting a shape of the inner surface of the through hole 131 of the first electrode tab 130, which is formed as the through hole 131 of the first electrode tab 130 of the electrode assembly 1000 overlaps with the inclined portion 332 of the third electrode tab 330, and a shape of the inner surface of the through hole 331 of the third electrode tab 330, with naked eyes (S200); and checking whether the first electrode tab 130 or the third electrode tab 330 is folded from the result of the vision inspection (S300).

Specifically, the step (S200) of visual inspection with the naked eye may include inspecting the inner surface shapes of the through holes 131 and 331 of the first electrode tab 130 and the third electrode tab 330 with the naked eye from the front, based on the third direction DR3 of the first electrode 100 of the electrode assembly 1000.

In addition, in the step (S300), it is possible to check whether or not the tab is folded by checking whether the shape of the inner surface of the through hole 131 of the first electrode tab 130 and the shape of the inner surface of the through hole 331 of the third electrode tab 330 are symmetrical based on the first direction (DR1), which is the longitudinal direction of the tab.

At this time, as shown in FIG. 6, when the shape of the inner surface of the through hole 131 of the first electrode tab 130 and the shape of the inner surface of the through hole 331 of the third electrode tab 330 are symmetrical with respect to the first direction DR1, it can be seen that the tab is normal without any fold.

On the other hand, as shown in FIG. 7, when the shape of the inner surface of the through hole 131 of the first electrode tab 130 and the shape of the inner surface of the through hole 331 of the third electrode tab 330 are asymmetrical based on the first direction DR1, it can be seen that folding of the first electrode tab 130 or the third electrode tab 330 has occurred.

FIG. 8 is a perspective view of an electrode assembly in which two unit cells are stacked, as viewed from one side, and FIG. 9 is a perspective view of the electrode assembly of FIG. 8 viewed from the opposite direction of the one side. Referring to these drawings, unit cells of the first electrode/separator/second electrode/separator/third electrode structure are stacked in order in the upper part, and unit cells of the fourth electrode/separator/fifth electrode/separator/sixth electrode structure are stacked in order in the lower part. At this time, the polarities of the first electrode, the third electrode, and the fifth electrode are the same, and the polarities of the second electrode, the fourth electrode, and the sixth electrode are the same.

Referring to FIG. 8, the first electrode tab 130, the third electrode tab 330, and the fifth electrode tab 230' having the same polarity protrude in the same direction. The first electrode tab 130 and the third electrode tab 330 are provided with inclined portions and through holes 131 and 331, respectively, the through hole of the first electrode tab and the inclined portion of the third electrode tab are arranged to overlap each other, and the inclined portion of the first electrode tab and the through hole of the third electrode tab are arranged to overlap each other. In addition, the fifth electrode tab 230' has through holes 231' and 232' at one edge and the other edge facing the one side, respectively.

Referring to FIG. 9, the second electrode tab 230, the fourth electrode tab 130' and the sixth electrode tab 330' having the same polarity protrude in the same direction, and the protruding direction is opposite to the protruding direction of the first electrode tab, the third electrode tab, and the fifth electrode tab having opposite polarities to these electrode tabs. The second electrode tab 230 is provided with through holes 231 and 232 at one edge and the other edge facing the one side, respectively. The fourth electrode tab 130' and the sixth electrode tab 330' are provided with inclined portions and through holes 131' and 331', respectively. The through holes 131' of the fourth electrode tab 130' and the inclined portion of the sixth electrode tab 330' are disposed to overlap each other, and the inclined portion of the fourth electrode tab 130' and the through hole 331' of the sixth electrode tab are disposed to overlap each other.

Meanwhile, as shown in FIGS. 8 and 9, in the case of a stacked electrode assembly with two or more stacked unit cells, after the vision inspection step (S200), a step (S210) of measuring an area of the inner surface of the through holes 131 and 331 of the electrode tabs, and a step (S220) of checking whether the positions of the electrode tabs 130, 230, 330, 130', 230', and 330 are defective from the measured area may be further included.

In the step of measuring the area (S210), the area of the inner surfaces of the through holes 131 and 331 may be measured using a light-transmitting sensor, but is not limited thereto. As the through hole of one electrode tab overlaps with the inclined portion of the other electrode tab, the through hole becomes a semicircle shape. At this time, the area of the empty space excluding the area occupied by the inclined portion is called the area of the inner surface. Referring to FIG. 8, when viewed from the top of the electrode assembly, the through hole 131 of the first electrode tab is viewed on the left side, and the through hole of the second electrode tab is viewed on the right side, based on the width direction DR2 of the electrode tab. The through hole 131 of the first electrode tab 130 overlaps with the inclined portion of the adjacent third electrode tab 330, and the area of the inner surface of the through hole 131 decreases as much as the overlapping portion. At this time, the area of the inner surface of the first electrode tab through hole 131 is called D1. In addition, the through hole 331 of the third electrode tab 330 overlaps with the inclined portion of the adjacent first electrode tab 131, and an empty space is formed except for the inclined portion, and the empty space is called D2 which is the area of the inner surface of the through hole 331 of the third electrode tab 330. If the first to sixth electrodes are properly aligned, the areas of D1 and D2 should be the same, but if the alignment is not correct, the areas of D1 and D2 will be mismatched. Accordingly, in the present invention, by measuring the area of the inner surface of the uppermost through holes, it is possible to check whether the position of the electrode tabs is defective from the measured area.

In addition, as the left through hole 231 of the second electrode tab 230 overlaps with the inclined portion of the sixth electrode tab 330', an empty space excluding the inclined portion is formed, and the area D3 of the inner surface, which is the empty space, can be measured. Further, as the right through hole 232 of the second electrode tab 230 overlaps with the inclined portion of the fourth electrode tab 130', an empty space excluding the inclined portion is formed, and the area D4 of the inner surface, which is the empty space, can be measured. In addition, it is possible to check whether the positions of the electrode tabs are defective according to whether D3 and D4 match.

Specifically, when light is emitted from the light-transmitting sensor to the front surface of the third direction DR3 of the first electrode 100 of the electrode assembly 1000, the light passing through the electrode assembly 1000 does not transmit the electrode tabs and transmits the inner surface which is not overlapped by the inclined portion in the through holes. As such, the area of the inner surface of the through holes can be measured.

Herein, in the step (S220), it can be determined whether the positions of the electrodes are defective by checking whether the inner surface areas of the through holes 131 and 331 of the first electrode tab 130 and the third electrode tab 330 measured through the light-transmitting sensor coincide with each other and whether the inner surface areas of the through holes 231 and 232 of the second electrode tab coincide with each other. That is, when the inner surfaces of the through holes coincide with each other, it can be confirmed that the alignment of the electrodes is good. On the other hand, if the inner surfaces of the through holes do not coincide with each other, the electrodes are misaligned, so that the first to sixth electrodes can be aligned so that the areas of the inner surfaces of the through holes coincide with each other.

As described above, the electrode assembly according to the present invention has the advantage that it is possible to easily and accurately check the tab folding of the electrode and the misaligned position due to the poor stacking of the unit cells without disassembling the stacked electrodes and separators. Accordingly, during the manufacturing process of the secondary battery, the tab folding and alignment of the electrode assembly can be automatically inspected and checked.

Hereinafter, an electrode assembly according to another embodiment of the present invention will be described in detail with reference to the drawings.

FIG. 10 is an exploded perspective view schematically showing an electrode assembly according to another embodiment of the present invention, FIG. 12 is a plan view showing a structure in which the electrode assembly of FIG. 11 is stacked, FIG. 13 is an enlarged plan view of part A of FIG. 12, and FIG. 14 is an enlarged plan view of part B of FIG. 12.

As illustrated in FIGS. 10 and 11, the surfaces on which the electrodes and the separators are stacked are parallel to the surfaces defined by a first direction DR1 and a second direction DR2. The normal direction of the surface on which the electrode and the separator are stacked is indicated by a third direction DR3. The third direction DR3 indicates the thickness direction of an electrode assembly 2000. The front and rear surfaces of each electrode and separator are separated by the third direction DR3. However, the directions indicated by the directions DR1, DR3, and DR3 are relative concepts and can be converted to other directions.

Referring to FIG. 10, the electrode assembly 2000 of the present invention may be a full cell in which the first electrode 600, the separator 410, the second electrode 700, and the separator 420 are sequentially stacked. Further, referring to FIG. 11, in the electrode assembly of the present invention, two or more of the full cells may be stacked. As such, the electrode assembly may have a structure in which the first electrode 600, the separator 410, the second electrode 700, the separator 420, the first electrode 800, and the separator 430, the second electrode 900, and the separator 440 are sequentially stacked.

In the electrode assembly 2000 of the full-cell structure of FIG. 10, the first electrode 600 may be coated with active materials 621 and 622 on both sides of the first electrode current collector 610, thereby forming a first active material layer 620 and may include a first electrode tab 630 protruding toward one outer periphery of the first direction DR1.

The first electrode tab 630 may be provided with a through hole 631 formed at one edge of the second direction DR2, and an inclined portion 632 at the other edge of the second direction DR2. Here, the inclined portion 632 may have a structure that forms a predetermined angle with respect to virtual extension lines (not shown) respectively extending both outer peripheries adjacent to each other among the outer peripheries of the first electrode tab 630. In addition, the inclined portion 632 is made of a straight line forming a predetermined angle, and the predetermined angle may be 10 to 80 degrees.

The second electrode 700 may have a second active material layer, which is generated active materials 721 and 722 are applied to both surfaces of the second electrode current collector 710, and have a second electrode tab 730 protruding toward the other outer periphery of the first direction DR1. That is, the first electrode tab 630 and the second electrode tab 730 are structures protruding in opposite directions based on the first direction DR1.

At this time, the second electrode tab 730 may be provided with a through hole 731 formed at one edge of the second direction DR2, and an inclined portion 732 at the other edge of the second direction DR2. Here, the inclined portion 732 may have a structure that forms a predetermined angle with respect to virtual extension lines (not shown) respectively extending both outer peripheries adjacent to each other among the outer peripheries of the second electrode tab 730. In addition, the inclined portion 732 is made of a straight line forming a predetermined angle, and the predetermined angle may be 10 to 80 degrees.

Meanwhile, the electrode assembly 3000 of FIG. 11 is obtained by stacking two electrode assemblies 2000 having the full cell structure, and the description of the first electrode 600 and the second electrode 700 in the full cell located at the top is as described above.

The first electrode 800 of the full cell, which is the unit cell located at the bottom, is coated with active materials 821 and 822 on both sides of the first electrode current collector 810 to form a first active material layer 820, and includes a first electrode tab 830 protruding toward an outer periphery of one side of the first direction DR1.

The first electrode tab 830 may be provided with a through hole 831 formed at one edge of the second direction DR2, and an inclined portion 832 at the other edge of the second direction DR2. Here, the inclined portion 832 may have a structure that forms a predetermined angle with respect to virtual extension lines (not shown) respectively extending both outer peripheries adjacent to each other among the outer peripheries of the first electrode tab 830. In addition, the inclined portion 832 is made of a straight line forming a predetermined angle, and the predetermined angle may be 10 to 80 degrees.

The second electrode 900 of the full cell, which is the unit cell located at the bottom, is coated with active materials 921 and 922 on both sides of the second electrode current collector 910 to form a second active material layer 920, and includes a second electrode tab 930 protruding toward an outer periphery of one side of the first direction DR1.

At this time, the second electrode tab 930 may be provided with a through hole 931 formed at one edge of the second direction DR2, and an inclined portion 932 at the other edge of the second direction DR2. Here, the inclined portion 932 may have a structure that forms a predetermined angle with respect to virtual extension lines (not shown) respectively extending both outer peripheries adjacent to each other among the outer peripheries of the second electrode tab 930. In addition, the inclined portion 932 is made of a straight line forming a predetermined angle, and the predetermined angle may be 10 to 80 degrees.

Meanwhile, the first electrode 600 has the same polarity as that of the first electrodes 800 in an adjacent unit cell (full cell), the second electrode 700 has the same polarity as that of the second electrode 900 in an adjacent unit cell (full cell), and the first electrodes 600 and 800 and the second electrodes 700 and 900 have the opposite polarities.

In addition, the through holes 631, 731, 831, and 931 formed in the first electrode tab 630 to the second electrode tab 930 may each have a shape selected from the group consisting of a circle, a rectangle, and a square, and the shape of the through holes 631, 731, 831, and 931 may be the same.

Referring to FIG. 12, the first electrode tab 630 and the first electrode 830 of an adjacent unit cell are formed in a structure protruding in the same direction based on the first direction DR1, and the second electrode tab 730 and the second electrode tab 930 of an adjacent unit cell are formed in a structure protruding in opposite directions based on the first direction DR1.

Referring to FIGS. 12 to 14, in the electrode assembly 3000 of the present invention, the through hole 631 of the first electrode tab 630 is disposed to overlap with the inclined portion 832 of the first electrode tab 830 of the adjacent unit cell, and the inclined portion 632 of the first electrode tab 630 is disposed to overlap with the through hole 831 of the first electrode tab 830 of the adjacent unit cell.

In addition, the through hole 731 of the second electrode tab 730 protruding in the opposite direction to the first electrode tab may be disposed to overlap with the inclined portion 932 of the first electrode tab 930 of the adjacent unit cell, and the inclined portion 732 of the second electrode tab 730 may be disposed to overlap with the through hole 931 of the second electrode tab 930 of the adjacent unit cell.

As described above, as the through hole 631 of the first electrode tab 630 overlaps with the inclined portion 832 of the first electrode tab 830 of the adjacent unit cell, the shape of the inner surface of the through hole 631 of the first electrode tab 630 is formed in a semicircular shape. In addition, as the inclined portion 632 of the first electrode tab 630 overlaps with the through hole 831 of the first electrode tab 830 of the adjacent unit cell, the shape of the inner surface of the through hole 831 of the first electrode tab 830 of the adjacent unit cell is formed in a semicircle shape.

At this time, the shape of the inner surface of the through hole 631 of the first electrode tab 630 and the shape of the inner surface of the through hole 831 of the first electrode tab 830 of an adjacent unit cell are symmetrical with respect to the first direction DR1. In this case, it can be confirmed that there is no folding of the fourth electrode tab 630 or the sixth electrode tab 630.

The second electrode tab 730 and the second electrode tab 930 of the adjacent unit cell are only opposite to the first electrode tabs 630 and 830 in their directions, but the shapes in which the through holes and the inclined portions overlap are the same as described above.

Accordingly, it is possible to check whether the electrode tabs 630, 730, 830, and 930 are folded through the shape in which the through holes 631, 731, 831, and 931 and the inclined portions 632, 732, 832, and 932 overlap.

Hereinafter, an inspection method of the electrode assembly 3000 according to an embodiment of the present invention will be described in detail with reference to the drawings.

The method for inspecting the electrode assembly 3000 may include: a step of preparing the electrode assembly 3000; a step of vision-inspecting the shape of the inner surface of the through hole 631 of the first electrode tab 600, which is formed as the through hole 631 of the first electrode tab 600 of the electrode assembly 3000 overlaps with the inclined portion 832 of the first electrode tab 800 of the adjacent unit cell; and a step (S700) of determining whether the first electrode tab to the second electrode tabs 630, 730, 830 and 930 are folded from the result of the vision inspection.

Specifically, the step (S600) of visual inspection with the naked eye may include inspecting the inner surface shapes of the through holes 631, 731, 831 and 931 of the first electrode tab to the second electrode tabs 630, 730, 830 and 930 with the naked eye from the front, based on the third direction DR3 of the first electrode 600 of the electrode assembly 3000.

Further, in the step (S700) of determining whether the tab folding has occurred, whether the tab folding has occurred may be determined by determining whether the shape of the inner surface of the through hole 631 of the first electrode tab 630 and the shape of the inner surface of the through hole 831 of the first electrode tab 800 of the adjacent unit cell are symmetrical with each other based on the first direction DR1 which is the longitudinal direction of the tab and whether the shape of the inner surface of the through hole 731 of the second electrode tab 700 and the shape of the inner surface of the through hole 931 of the second electrode tab 900 of the adjacent unit cell are symmetrical with each other in the first direction which is the longitudinal direction of the tab.

At this time, as shown in FIG. 13, when the shape of the inner surface of the through hole 631 of the first electrode tab 630 and the shape of the inner surface of the through hole 831 of the first electrode tab 830 of an adjacent unit cell are symmetrical with respect to the first direction DR1, it can be seen that the tab is normal without any fold. Further, as shown in FIG. 14, when the shape of the inner surface of the through hole 731 of the second electrode tab 730 and the shape of the inner surface of the through hole 931 of the second electrode tab 930 of an adjacent unit cell are symmetrical with respect to the first direction DR1, it can be seen that the tab is normal without any fold.

On the other hand, in the case that the shape of the inner surface of the through hole 631 of the first electrode tab 630 and the shape of the inner surface of the through hole 831 of the first electrode tab 830 of an adjacent unit cell are asymmetrical with respect to the first direction DR1, it can be confirmed that there is no folding of the first electrode tab 630 or the first electrode tab 630 of an adjacent unit cell. This also applies to the shape of the inner surface of the through hole 731 of the second electrode tab 730 and the shape of the inner surface of the through hole 931 of the second electrode tab 930 of the adjacent unit cell.

Further, after the vision inspection step (S500), the step (S510) of measuring the areas of the inner surfaces of the through holes 631, 731, 831 and 931 of the first electrode tabs 630 and 830 and the second electrode tabs 730 and 930; and a step (S520) of determining whether positions of the first electrode tabs 630 and 830 and the third electrode tabs 730 and 930 are defective from the measured areas may be further included.

In the step of measuring the area (S510), the areas of the inner surfaces of the through holes 631, 731, 831 and 931 of the first electrode tabs 630 and 830 and the second electrode tabs 730 and 930 may be measured using a light-transmitting sensor, but is not limited thereto.

In the step (S520) of checking whether the position is defective, poor stacking or poor positioning of electrodes can be checked by checking whether the inner surface areas of the through holes 631, 731, 831 and 931 of the first electrode tabs 630 and 830 and the second electrode tabs 730 and 930 measured by the light-transmitting sensor match each other.

Specifically, when the inner surface areas of the through holes 631 and 831 coincide with each other, and the inner surface areas of the through holes 731 and 931 coincide with each other, it can be confirmed that the alignment of the electrodes is good. On the other hand, if the inner surfaces of the through holes do not coincide with each other, the electrodes are misaligned, so that the electrodes can be aligned so that the areas of the inner surfaces of the through holes coincide with each other.

As described above, the electrode assembly according to the present invention has the advantage that it is possible to easily and accurately check the alignment of the electrode as well as the folding of the tab without disassembling the stacked electrodes and separators. Accordingly, during the manufacturing process of the secondary battery, the tab folding and alignment of the electrode assembly can be automatically inspected and checked.

As such, according to the electrode assembly and inspection method according to the present invention, despite the structure of multiple layers of positive and negative electrodes, it is possible to inspect the internal electrode position and automatically inspect defects such as internal electrode tab folding, thereby improving the ability to discriminate defective products.

Although the above has been described with reference to a preferred embodiment of the present invention, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

The invention claimed is:

1. An electrode assembly having at least one unit cell comprising a first electrode, a separator, a second electrode, separator, a third electrode structure, and a separator stacked in order as listed,
    wherein each of the first electrode and the third electrode includes a tab protruding from one side of the unit cell, and the second electrode includes a tab protruding from another side opposite from the one side of the unit cell,
    wherein each of the first electrode tab and the third electrode tab includes a through hole formed in an edge of one side of the electrode tab, and an inclined portion forming a predetermined angle on a plane parallel to the tab, and
    wherein the through hole of the first electrode tab and the inclined portion of the third electrode tab are formed at the same edge of the first and third electrode tab such that a part of the through hole of the first electrode tab and a part of the inclined portion of the third electrode tab overlap with each other when viewed from a top of the electrode assembly.

2. The electrode assembly of claim 1, wherein the tab of the second electrode comprises at least two through holes.

3. The electrode assembly of claim 1, wherein the first electrode and the third electrode have the same polarity, and the first electrode and the second electrode have opposite polarities.

4. An electrode assembly comprising a first unit cell and a second unit cell,
    wherein each of the first unit cell and the second unit cell comprises a first electrode, a separator, a second electrode, and a separator structure, stacked in order as listed, wherein the first electrode includes a tab protruding from one side of the unit cell, and the second electrode includes a tab protruding from another side opposite from the one side of the unit cell, and wherein each of the first electrode tab and the second electrode tab includes a through hole formed in an edge of one side of the electrode tab, and an inclined portion forming a predetermined angle in an edge on a plane parallel on the tab wherein the through hole of the first electrode tab in the first unit cell and the inclined portion of the first electrode tab in the second unit cell are arranged to overlap with each other, and wherein the through hole of the second electrode tab in the first unit cell and the inclined portion of the second electrode tab in the second unit cell are formed at the same edge of the second electrode tab such that a part of the through hole of the second electrode tab in the first unit cell and a part of the inclined portion of the second electrode tab in the second unit cell overlap with each other when viewed from a top of the electrode assembly.

5. The electrode assembly of claim 1, wherein each of the inclined portions is formed in a straight line forming the predetermined angle, and the predetermined angle is 10 to 80 degrees.

6. The electrode assembly of claim 1, wherein each of the through holes has a shape selected from the group consisting of a circle, a rectangle, and a square, respectively, and the shapes of the through holes are the same.

7. A method for inspecting an electrode assembly, comprising:
preparing the electrode assembly of claim 1;
vision-inspecting a shape of an inner surface of the through hole of the first electrode tab formed as the through hole of the first electrode tab overlaps with the inclined portion of the third electrode tab of the electrode assembly, and a shape of an inner surface of the through hole of the third electrode tab formed as the inclined portion of the first electrode tab overlaps with the through hole of the third electrode tab; and
determining whether the first electrode tab or the third electrode tab is folded based on a result of the vision inspection.

8. The method of claim 7, wherein the determining whether the first electrode tab or the third electrode tab is folded comprises determining whether the shape of the inner surface of the through hole of the first electrode tab and the shape of the inner surface of the through hole of the third electrode tab are symmetrical with respect to a longitudinal direction of the tab.

9. The method of claim 7, when two or more units cells are stacked in the electrode assembly, further comprising:
measuring an area of inner surfaces of through holes after the vision-inspecting; and
determining whether a position of the first and third electrode tab is defective from the measured area.

10. The method of claim 9, wherein in the determining whether the position is defective, the first and third electrodes are arranged to allow the areas of the inner surfaces of the through holes to coincide with each other.

11. A method for inspecting an electrode assembly, comprising:
preparing the electrode assembly of claim 4;
vision-inspecting shapes of inner surfaces of through holes of a plurality of electrode tabs having the same polarity; and
determining whether the first and second electrode tabs are folded based on a result of the vision inspection.

12. The method of claim 11, wherein the determining whether the electrode tabs are folded comprises determining whether the shapes of the inner surfaces of the two through holes are symmetrical to each other in a longitudinal direction of the tabs.

13. The method of claim 11, after the vision-inspecting, further comprising:
measuring areas of the inner surfaces of the through holes; and
determining whether a stacking is defective from the measured area.

14. The electrode assembly of claim 4, wherein each of the inclined portions is formed in a straight line forming the predetermined angle, and the predetermined angle is 10 to 80 degrees.

15. The electrode assembly of claim 4, wherein each of the through holes has a shape selected from the group consisting of a circle, a rectangle, and a square, respectively, and the shapes of the through holes are the same.

* * * * *